United States Patent [19]

Redmon

[11] Patent Number: 4,631,044
[45] Date of Patent: Dec. 23, 1986

[54] SPEED CHANGING DEVICE

[75] Inventor: Larry Redmon, Fort Wayne, Ind.

[73] Assignee: Challenge Tool & Manufacturing, Inc., New Haven, Ind.

[21] Appl. No.: 785,068

[22] Filed: Oct. 7, 1985

[51] Int. Cl.[4] .............................................. F16H 7/14
[52] U.S. Cl. .................................... 474/114; 474/136; 248/656
[58] Field of Search ................ 474/114, 136; 248/656, 248/657, 669

[56] References Cited

U.S. PATENT DOCUMENTS

| | | |
|---|---|---|
| 1,511,336 | 10/1924 | Hoey . |
| 1,642,220 | 9/1927 | Thrift . |
| 2,189,294 | 2/1940 | Pfleger . |
| 2,210,135 | 8/1940 | Tautz et al. . |
| 2,640,367 | 6/1953 | Rieser . |
| 2,762,663 | 11/1956 | Sloyan . |
| 2,812,054 | 11/1957 | Dorris et al. . |
| 2,976,745 | 3/1961 | Bade . |
| 3,421,724 | 1/1969 | Cornell . |
| 3,456,519 | 7/1969 | Anderson . |
| 3,494,208 | 2/1970 | Alagna ........................ 474/114 X |
| 3,872,801 | 3/1975 | Weddendorf . |
| 3,908,941 | 9/1975 | Bromley et al. . |

Primary Examiner—James A. Leppink
Assistant Examiner—Frank H. McKenzie, Jr.
Attorney, Agent, or Firm—Jeffers, Irish & Hoffman

[57] ABSTRACT

A speed changing device wherein the driver and driven pulleys can be replaced to attain a desired increase or decrease in rotational speed. The distance between the driver and driven pulleys is adjustable so that the tension of the drive belt coupling the driver and driven pulleys is also adjustable. The mounting plate upon which the motor and driver pulley are mounted can be tightened securely against the housing so that the previously set tension can be retained during the operation of the speed changing device.

11 Claims, 5 Drawing Figures

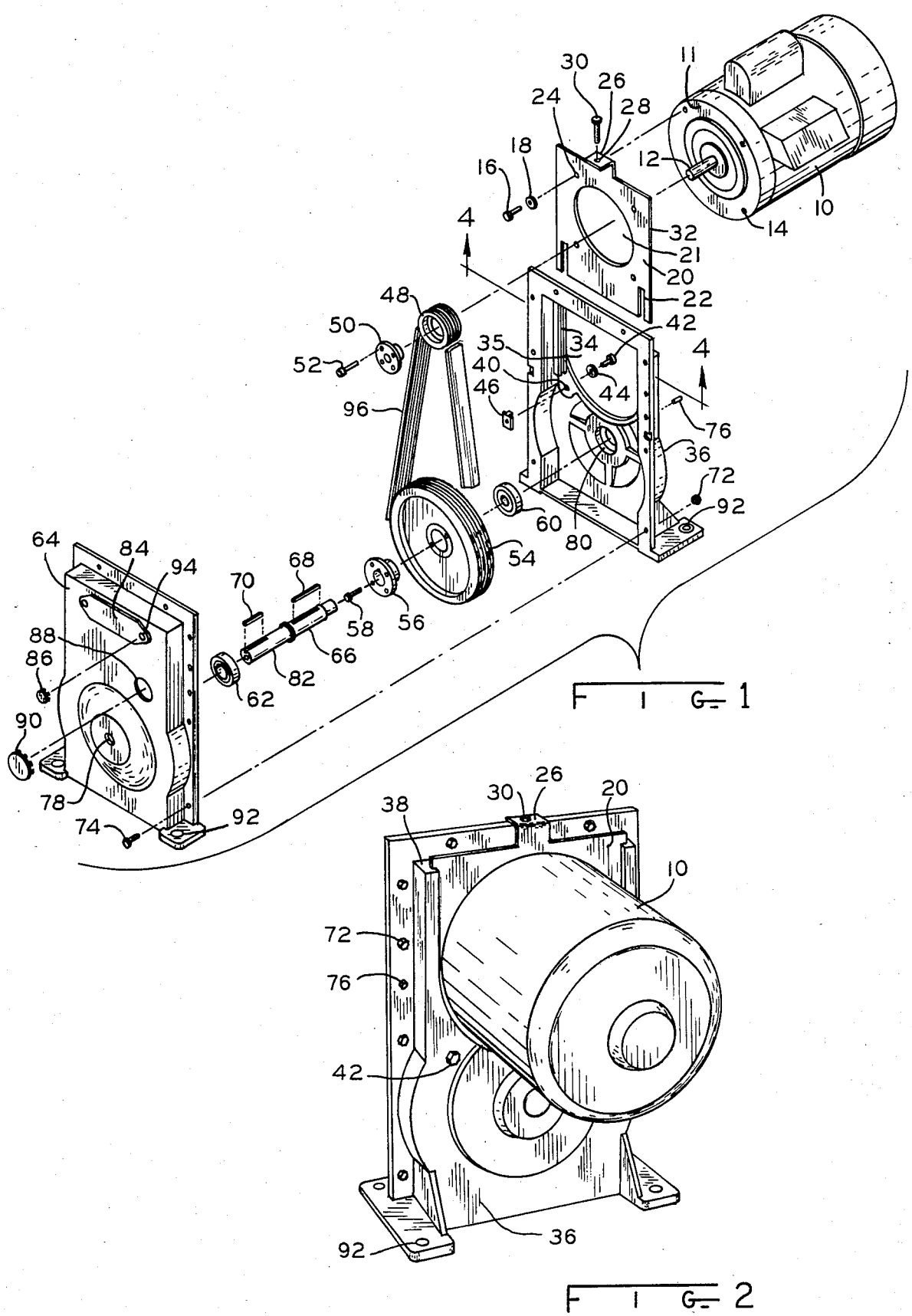

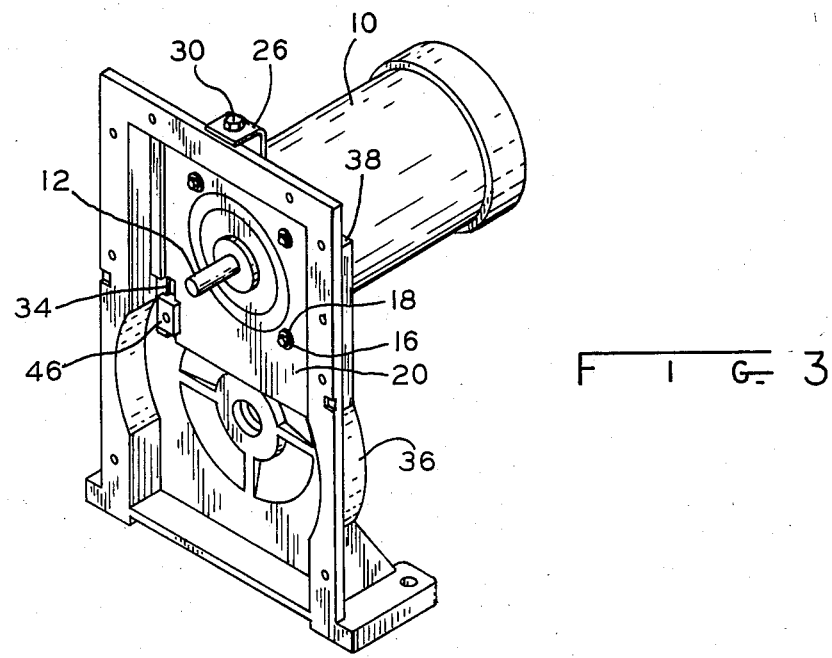
FIG. 3
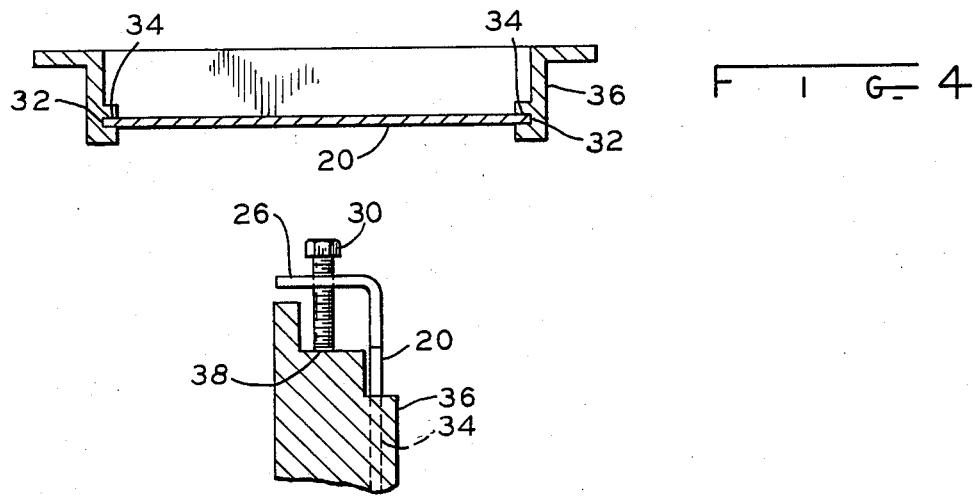
FIG. 4
FIG. 5

SPEED CHANGING DEVICE

BACKGROUND OF THE INVENTION

This invention relates generally to a speed changing device having a driver and a driven pulley different in diameter from each other and being coupled with an endless member so that the input rotational speed provided by a motor is changed, and thus, a different output rotational speed is provided. More specifically, the invention relates to a structure which allows various pulley sizes to be replaced and used so that a desired increase or decrease in the rotational speed can be attained. The structure further provides for the adjustment of the distance between the driven and driver pulleys so that the tension of the drive belt can be adjusted.

Variable speed electric motors are generally very expensive compared to single constant speed electric motors. Further, in many applications, only a single different rotational speed than that of a constant speed motor is desired. Accordingly, there is a need for a mechanism to decrease or increase the output rotational speed of a constant speed motor. Often, the output speed must be reduced and the power increased while on other occasions the rotational output speed must be increased and the power decreased accordingly. Further yet, there is a need for the speed changing mechanism to provide for a range of decreasing or increasing speed ratios with the same mechanism, and it is highly desirable if this can be accomplished by replacing only a minimum number of parts.

In the past, speed changers have utilized primarily gear mechanisms. Gears, however, are very expensive, noisy, require maintenance in terms of lubrication and tend to wear quickly. Further, gear mechanisms do not provide a means for easily changing the output speed because it is costly and generally difficult to retain the tolerances required when replacing gears so as to make them mesh properly. There is, therefore, a need for a speed changing mechanism which substantially overcomes the disadvantages associated with gear changing mechanisms.

Many disadvantages associated with gearing can be overcome by utilizing pulleys and drive belts. Various pulley sizes can be selected and coupled together with a drive belt so that a different rotational speed output can be attained. Thus, there is a need for a speed changing device wherein only the pulleys and drive belt can be changed and therethrough different output speeds can be obtained.

However, there is also a need for a structure whereby the tension of the drive belt can be adjusted for any combination of pulleys while using the same speed changing device. The structure used to provide the tension adjustment needs to be easily accessible and easily used through the use of conventional tools. The adjustment structure should also provide for an infinite number of settings within the ratio range so that the tension of the drive belt can be adjusted to an infinite number of settings. Upon attaining the desired tension, there is also a need to fasten and hold in position the previously set tension adjustment during the operation of the speed changing mechanism.

Overall, there is a need to make the structure for adjusting and retaining the tension in the drive belt strong and capable of withstanding the forces exerted upon it while still being cost efficient. Further yet, the adjusting structure must provide a way for easily adjusting the tension of the endless member after it has been in operation for a period of time.

SUMMARY OF THE INVENTION

It is the principle object of the invention to fill the needs and overcome the disadvantages discussed above which we associated with speed changing devices. In essence, it is the object of this invention to provide a speed changing device in which various sized pulleys can easily be installed and the tension of the endless member rotatably coupling together said pulleys can easily be adjusted to a desired setting. It is also the object of the invention to provide an easily accessible and structurely sound method for retaining the preset tension of the drive belt during the operation of the speed changing device. Further, it is the object of the invention to provide the above-described advantages with a cost efficient and yet structurely sound structure.

In one form of the invention, the invention is directed to a speed changer having a housing, a motor mounting plate, a driver pulley, a driven pulley, a shaft for mounting the driven pulley thereupon, an endless member for rotatably coupling the driver and driven pulleys and a screw means for slidably adjusting the motor mounting plate upon the housing. By slidably adjusting the motor mounting plate, the motor that can be attached thereto along with the driver pulley which is attached upon the motor shaft are moved away from or closer to the driven pulley thereby causing the tension of the drive belt to be adjusted.

In another form thereof, the invention is directed to a speed changer for changing the rotational output speed of an electric motor by having a motor mounting plate slidably receivable within a housing. The motor mounting plate and housing have corresponding apertures such that the motor output shaft extends through said apertures when the motor is mounted upon the mounting plate. A driver pulley is concentrically mounted upon the motor output shaft and a driven pulley is concentrically mounted upon the speed changer output shaft which is rotatably mounted upon the housing. A drive belt rotatably couples the driver and driven pulleys and a screw means provides for slidable adjustment of the mounting plate so that the tension of the drive belt can be adjusted. The mounting plate is provided with a slot communicating with a hole in the housing. A bolt is received through both the hole and the slot and thereafter engages a nut so that the mounting plate can be fastened against the housing.

In another form thereof, the invention is directed to a speed reducer having a generally rectangular motor mounting plate slidably receivable within two parallel grooves located in a housing. An aperture in the motor mounting plate and an aperture in the housing communicate such that the motor output shaft extends therethrough when the motor is mounted upon the motor mounting plate. A driver pulley is concentrically mounted upon the motor output shaft and a driven pulley, larger in diameter than the driver pulley, is concentrically mounted on the speed reducer output shaft. A drive belt rotatably couples the driver and driven pulleys. The tension of the drive belt is adjusted through the use of an adjusting bolt which threadably engages a threaded hole within the plate flange which is connected to the motor mounting plate. By twisting the adjusting bolt, the bolt pushes against a bearing surface on the housing and thereby slidably adjusts the location of the mounting plate thereby also adjusting the tension of the drive belt. The mounting plate is provided with a slot which communicates with a hole located in the housing. A bolt is received through the hole and the slot and threadably engages a T-nut which in turn is slidably engaged within the slot of the mounting plate. Accordingly, the mounting plate can be tightened against the housing by twisting only the bolt which is threadably received in the rotationally stationary T-bolt.

Other objects and advantages of the invention will become apparent from the following specification taken in conjunction with the accompanying drawings.

BRIEF DESCRIPTION OF THE DRAWINGS

FIG. 1 is an exploded perspective view showing one embodiment of the speed changing device of the present invention along with an electric motor.

FIG. 2 is a back perspective view of the speed changing device of FIG. 1, as assembled along with an electric motor.

FIG. 3 is a front perspective view of the speed changing device of FIG. 1, showing the inside of the rear housing as assembled in combination with the mounting plate and along with an electric motor.

FIG. 4 is a cross-sectional view of the rear housing and mounting plate along lines 4—4 of FIG. 1.

FIG. 5 is a side elevational view showing the interconnection between the adjusting bolt, the mounting plate, and the rear housing of the present invention.

DESCRIPTION OF A SPECIFIC EMBODIMENT

As shown in the drawings, the device is a speed changer used for changing the rotational output speed of an electric motor. More specifically, the device as shown in FIG. 1 is a speed reducer.

Referring to FIG. 1, there is an electric motor 10 which can be mounted upon motor mounting plate 20. Electric motor 10 has at one end 11 thereof threaded motor mounting holes 14 and a motor output shaft 12 extending outward from said motor end 11. Motor mounting plate 20 is fastened to electric motor 10 via motor mounting screws 16 which extend through mounting screw lock washers 18 and plate holes 24 and threadably engage motor mounting holes 14. Although not shown in FIG. 1, a total of four motor mounting screws 16 and four mounting screw lock washers 18 are used to fasten electric motor 10 to motor mounting plate 20.

Motor mounting plate 20 has two straight edges 32 which are slidably received within guide grooves 34 located within rear housing 36. As shown in FIGS. 2-4, when the device is assembled, mounting plate 20 is held in place upon rear housing 36 via the guide grooves 34 which slidably hold in position motor mounting edges 32.

Motor mounting plate 20 also has a flange 26 mediately disposed along the top edge of plate 20, connected thereto and extending substantially perpendicular to said mounting plate 20. Flange 26 has a threaded hole 28 therein for threadably receiving adjusting bolt 30. As shown in FIGS. 2, 3 and 5, rear housing 36 has bearing surface 38 upon which adjusting bolt 30 rests upon and pushes against whenever adjusting bolt 30 is rotated accordingly.

Motor mounting plate 20 further has plate elongate slots 22 at the opposite end of said plate flange 26. When motor mounting plate 20 is in the assembled position as shown in FIGS. 2 and 3, rear housing holes 40 are aligned with plate elongate slots 22. Plate locking bolts 42 are inserted through plate locking washers 44, rear housing holes 40, and plate elongate slots 22 and thereafter threadably engage plate locking T-nuts 46. T-nuts 46 slidably engage plate elongate slots 22 such that rotation of the T-nuts 46 is prevented and tightening of plate locking bolts 42 can be accomplished by twisting only the head of plate locking bolts 42. When plate locking bolts 42 are tightened in this manner, motor mounting plate 20 is forced against rear housing 36 thereby increasing the frictional forces between motor mounting plate 20 and rear housing 36 and, accordingly, preventing motor mounting plate 20 from moving within guide grooves 34.

As shown in FIGS. 1 and 3, when electric motor 10 is mounted upon mounting plate 20, which, in turn, is slidably received in rear housing 36, the motor output shaft 12 extends through both mounting plate aperture 21 of mounting plate 20 and rear housing aperture 35 of rear housing 36.

Drive pulley 48 is concentrically mounted upon motor output shaft 12 through the use of drive hub 50 and drive hub screws 52.

Driven pulley 54 is concentrically mounted upon main shaft 66 through the use of driven hub 56, driven hub screws 58 and driven pulley key 68. Main shaft 66 is rotatably held in position through the use of rear driven bearing 60 and front driven bearing 62. Rear driven bearing 60 is received within rear bearing bore 80 located within rear housing 36. Front driven bearing 62 is received within a front bearing bore (not shown) located within front housing 64.

Driver pulley 48 and driven pulley 54 are rotatably coupled together with an endless member such as V-belt 96. When front housing 64 and rear housing 36 are assembled together, reducer output shaft portion 82 extends through output shaft hole 78. Output shaft key 70 may thereafter be used, when concentrically mounting upon the reducer output shaft portion 82 another pulley or sprocket for a particular work load. Front housing 64 and rear housing 36 are assembled and held together through the use of housing bolts 74, housing nuts 72, and dowel pins 76.

As shown in FIG. 1, a data plate 84 is used upon front housing 64 to show, thereupon, various information such as the speed reduction ratio. Data plate 84 is mounted upon front housing 64 through the use of data plate plugs 86 which are inserted in data plate holes 94.

For the purpose of determining the tension of V-belt 96, which couples the driver pulley 48 and driven pulley 54, an inspection hole 88 is provided within front housing 64. Further, for safety purposes, an inspection hole plug 90 fits over inspection hole 88, and thus, helps prevent accidents caused by foreign objects inadvertently being inserted within inspection hole 88.

As shown in FIGS. 1 and 2, front housing 64 and rear housing 36 have contained in the bottom flanges thereof device mounting holes 92. Device mounting bolts can be inserted through the device mounting holes 92 and, accordingly, the speed changing device can be mounted upon any given surface.

In operation, drive pulley 48 and driven pulley 54 are selected and sized so that a desired output rotational speed can be obtained at the given electric motor 10 speed. The selected pulleys are then mounted upon the respective motor output shaft 12 and main shaft 66 as described above through the use of hubs and hub screws. Electric motor 10 is disposed at the same attitude throughout the adjusting process so that mounting the pulleys and placing V-belt 96 in position is made comparatively easy. Front housing 64 and rear housing 36 are thereafter fastened together through the use of housing bolts 74, housing nuts 72, and dowel pins 76. Then, while the plate locking bolts 42 are slightly loose, adjusting bolt 30 is twisted causing it to push against bearing surface 38 and thus causing mounting plate 20 along with electric motor 10 and driver pulley 48 to move away from driven pulley 54. Accordingly, the tension of drive belt 96 is increased to whatever tension is desired. Generally, the tension is adjusted so that slippage under the work load is significantly decreased while forces placed on the motor shaft 42 and main shaft 66 are within a structurely acceptable range. The tension can be determined by feeling V-belt 96 through inspection hole 88. When the desired tension is obtained, plate locking bolts 42 are tightened thereby forcing mounting plate 20 and rear housing 36 to come into frictional contact with each other. The friction created through the tightening of locking bolts 42 along with the pushing force against bearing plate 38 by adjusting bolt 30, both help keep the mounting plate 20 in the adjusted position during the operation of the speed changing device. By keeping mounting plate 20 in position, electric motor 10 and driver pulley 48 are thus also kept in position during operation thereby also causing the adjusted previously set tension to be retained.

In another embodiment, it is contemplated that the driver and driven pulleys can be replaced by chain sprockets and that the drive belt can be replaced by a chain. The remaining structure described above remains the same and is again used for the purpose of providing the correct tension on the chain for any given combination of sprocket sizes. Naturally, through the use of sprockets and a chain, slippage is totally eliminated.

While the invention has been described as having a specific embodiment, it will be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A speed changer for changing the rotational output speed of a motor comprising:
    a motor mounting plate adapted to receive a motor thereupon, said plate having an aperture through which passes the motor output shaft;
    a housing having two generally parallel guide grooves for slidably receiving said motor mounting plate and an aperture between said grooves through which passes said motor output shaft;
    a driver pulley adapted to be concentrically mounted upon said motor output shaft;
    a speed changer output shaft rotatably mounted upon said housing;
    a driven pulley different in diameter than said driver pulley concentrically mounted upon said speed changer output shaft;
    an endless member rotatably coupling together said driver and driven pulleys; and
    a screw means, connected to said mounting plate, for slidably adjusting said mounting plate within said grooves so as to provide tension to said drive belt.

2. The speed changer of claim 1 further comprising:
    said mounting plate containing a slot therein substantially parallel to said guide grooves;
    said housing containing a hole therein communicating with said slot; and
    a nut-bolt assembly, said bolt being received through said hole and slot, and said nut threadably engaging said bolt so that said mounting plate can be tightened against said housing.

3. The speed changer of claim 2 wherein said nut is a T-nut slidably received within said slot so that rotation of said T-nut is prevented.

4. The speed changer of claim 1 further comprising:
    said mounting plate containing two slots generally parallel to said guide grooves;
    said housing containing a first hole therein communicating with one of said slots;
    said housing containing a second hole therein communicating with the other of said slots;
    two bolts, each extending through a corresponding hole and slot; and
    two nuts, each threadably engaging a respective bolt so that said mounting plate can be tightened against said housing.

5. The speed changer of claim 4 wherein said nuts are T-nuts slidably received within a respective slot so that rotation of said T-nuts are prevented.

6. The speed changer of claim 1 wherein said screw means comprises:
    an integral plate flange connected and generally perpendicular to said motor mounting plate;
    a threaded hole within said flange;
    an adjusting bolt threadably engaging said threaded hole and extending therethrough; and
    a bearing surface on said housing generally aligned and perpendicular to said adjusting bolt whereat the end of said adjusting bolt can push against and slidably adjust said mounting plate.

7. A speed changer for changing the rotational output speed of an electric motor comprising:
    a motor mounting plate adapted to receive an electric motor thereupon, said plate having an aperture through which passes the motor output shaft;
    a housing having two generally parallel guide grooves for slidably receiving said motor mounting plate and an aperture between said grooves through which passes said motor output shaft;
    a driver pulley adapted to be concentrically mounted upon said motor output shaft;
    a speed changer output shaft rotatably mounted upon said housing;
    a driven pulley different in diameter from said driver pulley concentrically mounted upon said speed changer output shaft;
    a drive belt rotatably coupling together said driver and driven pulleys;
    a screw means connected to said mounting plate adapted for slidably adjusting said mounting plate within said grooves so as to provide tension to said drive belt;
    a slot within said mounting plate generally parallel to said guide grooves;
    a hole in said housing communicating with said slot;
    a bolt received through said hole and said slot; and
    a nut threadably engaging said bolt whereby said mounting plate and housing can be tightened together.

8. The speed changer of claim 7 wherein said nut is a T-nut slidably received within said slot so that rotation of said T-nut is prevented.

9. The speed changer of claim 7 wherein said screw means comprises:
   an integral plate flange connected and generally perpendicular to said motor mounting plate;
   a threaded hole within said flange;
   an adjusting bolt threadably engaging said threaded hole and extending therethrough; and
   a bearing surface on said housing generally aligned and perpendicular to said adjusting bolt whereat the end of said adjusting bolt can push against and slidably adjust the location of said mounting plate with respect to said housing.

10. A speed reducer for reducing the rotational output speed of an electric motor comprising:
    a generally rectangular motor mounting plate for mounting a motor thereupon, said plate having an aperture for receiving therethrough the motor output shaft;
    a housing having two substantially parallel guide grooves facing each other for slidably receiving said motor mounting plate and an aperture between said grooves for receiving therethrough said motor output shaft;
    a driver pulley adapted to be concentrically mounted upon said motor output shaft;
    a speed reducer output shaft rotatably mounted upon said housing;
    a driven pulley larger in diameter than said driver pulley concentrically mounted upon said speed reducer output shaft;
    a drive belt rotatably coupling together said driver and driven pulleys;
    a slot within said mounting plate substantially parallel to said guide grooves;
    a hole in said housing communicating with said slot;
    a bolt being received through said hole and said slot;
    a T-nut threadably engaging said bolt and slidably received within said slot whereby said mounting plate and housing can be tightened together;
    an integral plate flange connected and substantially perpendicular to said motor mounting plate;
    a threaded hole within said flange;
    an adjusting bolt threadably engaging said threaded hole and extending therethrough; and
    a bearing surface on said housing substantially aligned and perpendicular to said adjusting bolt whereat the end of said adjusting bolt can engageably push against and slidably adjust said mounting plate within said grooves and thereby provide tension to said drive belt.

11. The speed reducer of claim 10 further comprising:
    a second slot within said mounting plate substantially parallel to said guide grooves;
    a second hole in said housing communicating with said second slot;
    a second bolt received through said second hole and said second slot; and
    a second T-bolt threadably engaging said second bolt and slidably received within said second slot.

* * * * *